United States Patent [19]

Yamashita

[11] Patent Number: 5,198,906
[45] Date of Patent: Mar. 30, 1993

[54] DEFECTIVE PIXEL COMPENSATION WITH MEMORY USING INTERPOLATION VIA PLURAL SAMPLE-AND-HOLD CIRCUITS

[75] Inventor: Masahiro Yamashita, Kanagawa, Japan

[73] Assignee: Sony Corporation, Tokyo, Japan

[21] Appl. No.: 780,176

[22] Filed: Oct. 21, 1991

[30] Foreign Application Priority Data

Oct. 25, 1990 [JP] Japan .................. 2-285813

[51] Int. Cl.$^5$ ............................................. H04N 3/15
[52] U.S. Cl. .............................. 358/213.17; 358/41
[58] Field of Search ................ 358/213.17, 213.15, 358/41, 50

[56] References Cited

U.S. PATENT DOCUMENTS 5,010,408 4/1991 Toohey .................. 358/213.15 X
5,095,368 3/1992 Miyakawa et al. ............ 358/213.17

*Primary Examiner*—James J. Groody
*Assistant Examiner*—Mark R. Powell
*Attorney, Agent, or Firm*—Hill, Steadman & Simpson

[57] ABSTRACT

A defect correction circuit for a solid-state imaging device, made up of a large number of charge-coupled devices, is disclosed. The correcting circuit includes a storage circuit for storing position data indicating the position of a defective pixel among a number of pixels of the solid-state imaging device, a sampling pulse generator for generating a first sampling pulse timed to the pixels of the imaging device, a second sampling pulse phase-shifted by 180° with respect to the first sampling pulse, a first sample-and-hold circuit for sample-holding an imaging output signal from the imaging device by the first sampling pulse, and a second sample-and-hold circuit for sample-holding an output signal of the first sample-and-hold circuit by the second sampling pulse. The sampling pulse generator withholds the outputting of a first sampling pulse associated with the defective pixel among the pixels of the solid-state imaging device, based on the position data read out from the storage device. The sampling pulse generator also elongates the pulse width of a second sampling pulse associated with the defective pixel as far as at least the trailing edge of a first sampling pulse succeeding the second sampling pulse. The defect correction circuit may additionally include a third sample-and-hold circuit for oversampling the imaging output signal corrected for defect by the second sample-and-hold circuit by a third sampling pulse to eliminate noise contained in the imaging output signal.

4 Claims, 5 Drawing Sheets

DEFECTIVE PIXEL COMPENSATION WITH MEMORY USING INTERPOLATION VIA PLURAL SAMPLE-AND-HOLD CIRCUITS

BACKGROUND OF THE INVENTION

1. Field of the Invention

This invention relates to a defect compensation circuit for a solid-state imaging device in which an imaging output signal from a defective pixel is replaced by an imaging output signal from a defect-free pixel by way of performing a defect compensation.

In the present specification, the solid-state imaging device or CCD image sensor means an array of charge coupled devices (CCDs) in which electrical charges accumulated in one charge coupled device are transferred to the next for transferring data represented by electrical charges.

2. Description of Related Art

It is known that, in the solid-state imaging device, constituted by an array of semiconductor devices known as chargecoupled devices, deterioration in the picture quality is produced as a result of the imaging output from a defective pixel which outputs a signal of a peculiar level due to local crystal defects of the semiconductor in the absence of the incident light. The defective pixels in the solid-state imaging device may be typified by the black-flaw pixels and white-flaw pixels, the imaging outputs of which appear as black points and white points in the image displayed on a monitor screen, respectively.

Heretofore, in an imaging device making use of the CCD image sensor, as shown in FIG. 6, the CCD image sensor 21 is driven by a CCD driving circuit 24 operated responsive to timing signals generated by a timing signal generator 23 based on synchronizing signals generated by a synchronizing signal generator 22, so that the imaging signal charges of pixels are read line-sequentially at a time by means of a horizontal transfer register. An imaging output signal $S_{OUT}$, sequentially read out from the pixels of the CCD image sensor 21, is outputted at an output terminal 26 by means of a sample-and-hold circuit 25.

The timing signal generator 23 is adapted for generating the above mentioned timing signals for operating the CCD driving circuit 24, while generating and outputting sampling pulses $\phi_{SH}$ adapted for operating the sample-and-hold circuit 25.

For avoiding deterioration in the picture quality due to the imaging output from defective pixels of the above described CCD image sensor by signal processing of the imaging output, defect data indicating the presence or absence of defects from pixel to pixel of the CCD image sensor 21 are stored in a memory and, as shown in FIG. 7, the operation of the timing signal generator 23, which applies a sampling pulse $\phi_{SH}$ to the sample-and-hold circuit 25, which in turn sample-holds the imaging output signal $S_{OUT}$ from the CCD image sensor 21, is controlled on the basis of the defect data read out from the memory 30 for withholding the sampling pulse $\phi_{SH}$ timed to the defective pixel of the CCD image sensor 21 by way of performing a defect compensation by a so-called 0'th order holding interpolation of substituting an imaging output from a normal pixel adjacent to the defective pixel for the imaging output from the defective pixel. This type of the defect compensation circuit is disclosed in, for example, the JP Patent Publication KOKOKU No. 61-43908 (1986).

With the defect compensation by the conventional 0'th order holding interpolation, if a boundary line 1 between the light and the dark of the object image is situated at a defective pixel $P_3$, as shown by hatchings in FIG. 7, and the imaging output signal $S_{OUT}$ undergoes a transition in signal level, the sampling pulse $\phi_{SH}$ timed to the defective pixel $P_3$ is withheld, as shown by a broken line, for substituting an imaging output $S_2$, from the left-side adjacent normal pixel $P_2$ for the imaging output $S_3$ of the defective pixel $P_3$, so that a correction error $\Delta$ is produced.

OBJECT AND SUMMARY OF THE INVENTION

In view of the above discussed status of the art, it is a principal object of the present invention to provide a defect compensation circuit for substituting an output signal from a defect-free pixel for an output signal from a defective pixel of the solid-state imaging device, whereby the correction error is diminished and imaging output signals with a satisfactory picture quality may be produced.

In accordance with the present invention, there is provided a defect correcting circuit for a solid-state imaging device comprising a storage circuit for storing position data indicating the position of a defective pixel among a number of pixels of the solid-state imaging device, a sampling pulse generator for generating a first sampling pulse timed to the pixels of the imaging device, and a second sampling pulse phase-shifted by 180° with respect to said first sampling pulse, a first sample-and-hold circuit for sample-holding an imaging output signal from the imaging device by said first sampling pulse, and a second sample-and-hold circuit for sample-holding an output signal of said first sample-and-hold circuit by said second sampling pulse, wherein said sampling pulse generator withholds the outputting of a first sampling pulse associated with the defective pixel among the pixels of the solid-state imaging device, based on said position data read out from said storage means, and wherein said sampling pulse generator elongates the pulse width of a second sampling pulse associated with the defective pixel to at least the trailing edge of a first sampling pulse succeeding said second sampling pulse.

With the defect correcting circuit for a solid-state imaging device according to the present invention, the sampling pulse generator outputs first sampling pulses timed to the outputting of defect-free pixels from a large number of pixels of the solid-state imaging device, based on position data read out from storage means, while outputting second sampling pulses with elongated pulse width timed to the outputting of the defective pixels. The first sample-and-hold circuit sample-holds output signals from the solid-state imaging device by the first sampling pulse to perform defect compensation based on 0'th order holding interpolation. The second sample-and-hold circuit performs a defect correction by mean-value interpolation by sample-holding the output signals of the first sample-and-hold circuit, that is, the imaging output signals corrected for defect by 0'th order holding interpolation, by the second sampling pulses.

DESCRIPTION OF PREFERRED EMBODIMENTS

Figure 1:
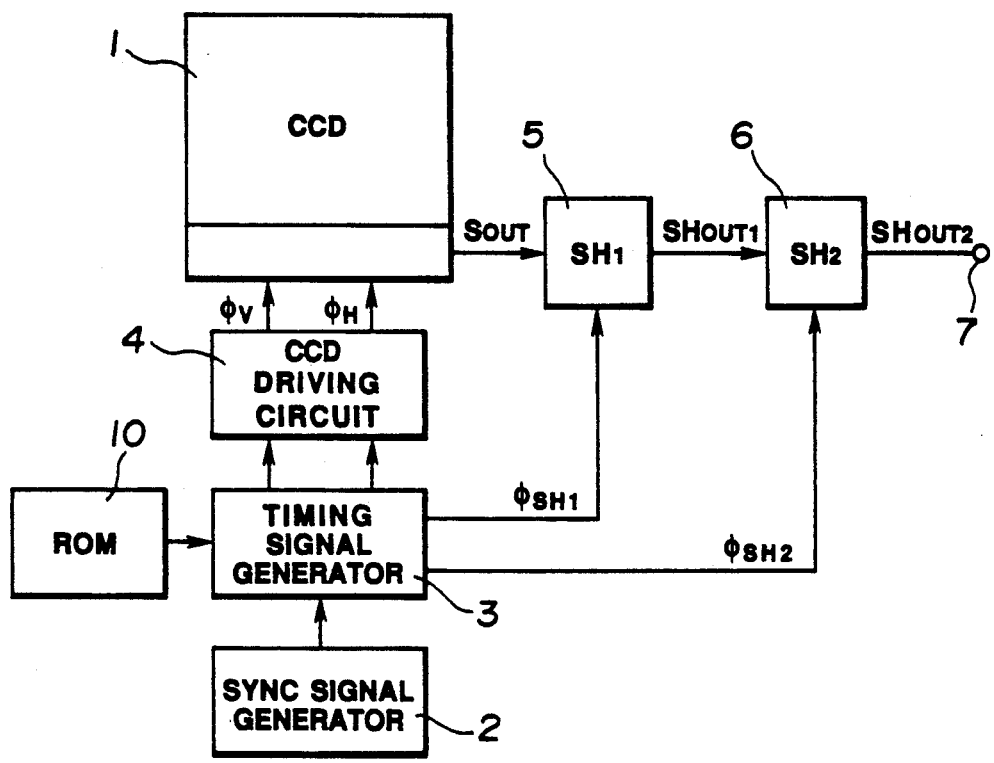
FIG. 1 is a block diagram showing a construction of a defect compensation circuit of a solid-state imaging device according to the present invention.

By referring to the drawings, certain preferred embodiments of the present invention will be explained in detail.

The defect compensation circuit for the solid-state imaging device according to a first embodiment of the present invention is constructed as shown for example in FIG. 1.

With the defect compensation circuit shown in FIG. 1, the present invention is applied to a CCD video camera making use of a CCD image sensor in its imaging section, and includes a readonly memory 10 in which there are stored defect position data indicating the positions of the defective pixels of the CCD image sensor 1.

The CCD image sensor 1 is driven by a CCD driving circuit 4 operated responsive to timing signals generated by a timing signal generator 3 on the basis of synchronizing signals generated by a synchronizing signal generator 2, so that imaging signal charges of the pixels are read line-sequentially by means of a horizontal transfer register. The imaging output $S_{OUT}$, read out sequentially from the pixels of the CCD image sensor 1, are outputted at an output terminal 7 via a first sample-and-hold circuit 5 and a second sample-and-hold circuit 6.

The timing signal generator 3 is adapted for generating the timing signal for operating the CCD driving circuit 4 as well as first and second sampling pulses $\phi_{SH1}$, $\phi_{SH2}$ for operating the first and second sample-and-hold circuits 5 and 6, respectively.

Based on the defect position data read out from the readonly memory 10, those of the first sampling pulses $\phi_{SH1}$ from the timing signal generator 3 which are timed to the output timings of the defective pixels among a number of pixels of the CCD image sensor 1 are dropped, so that the first sampling pulses are outputted at the output timings of the defect-free pixels so as to be supplied to the first sample-and-hold circuit 5.

The second sampling pulses $\phi_{SH2}$ from the timing signal generator 3 are outputted with a phase shift of 180° with respect to the first timing pulse $\phi_{SH1}$ so as to be supplied to the second sample-and hold circuit 6. Moreover, the second sampling pulses $\phi_{SH2}$ are extended in pulse width at the output timings of the defective pixels among the pixels of the CCD image sensor 1.

Meanwhile, the pulse width $\tau_0$ of the second sampling pulse $\phi_{SH2}$ timed to the output timings of the defective pixels is selected to be longer than a time duration $\tau_1$ since its rising edge until a falling edge of the succeeding first sampling pulse $\phi_{SH1}$ and shorter than the time duration $\tau_2$ since the aforementioned rising edge until the rising edge of the next succeeding first sampling pulse $\phi_{SH1}$.

The first sample-and-hold circuit 5 sample-holds the imaging output signals $S_{OUT}$, sequentially read out from the pixels of the CCD image sensor 1, by the first sampling pulses $\phi_{SH1}$ from the timing signal generator 3. The second sample-and-hold circuit 6 sample-holds the output signals $SH_{OUT1}$ from the first sample-and-hold circuit 5 by the second sampling pulses $\phi_{SH2}$ from the timing signal generator 3 to output the resulting signals at the output terminal 7.

Figure 2:
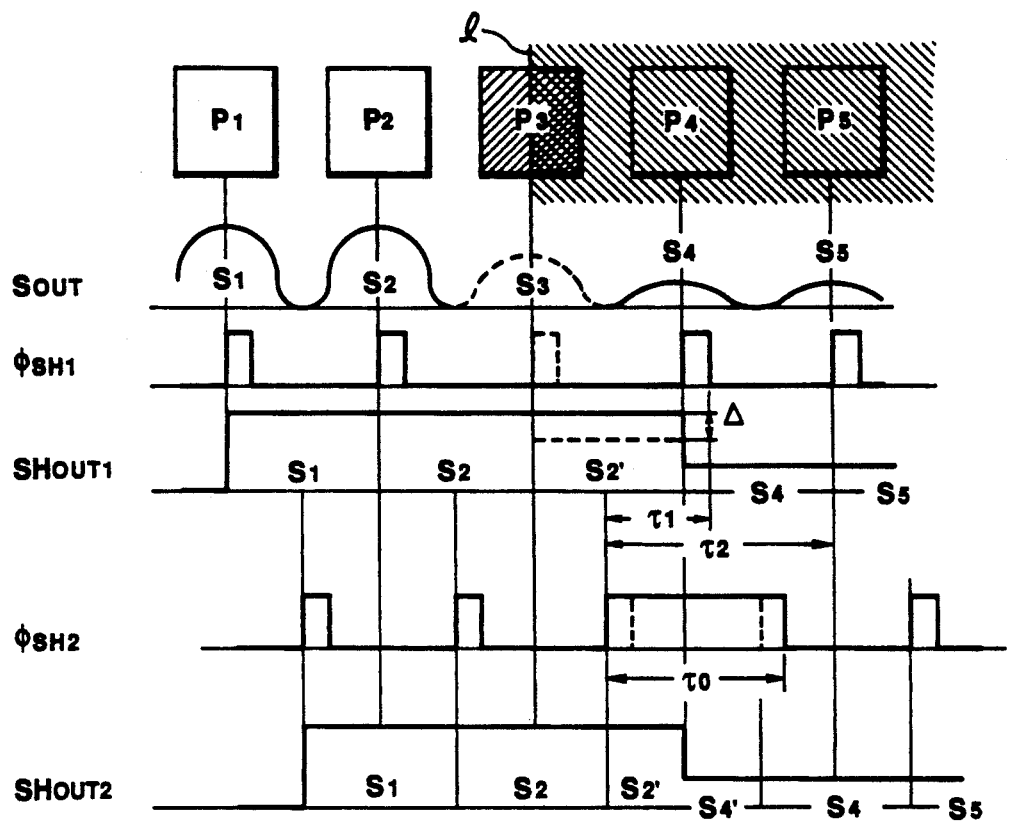
FIG. 2 is a timing chart for illustrating the operation of the defect compensation circuit shown in FIG. 1.
Figure 3:
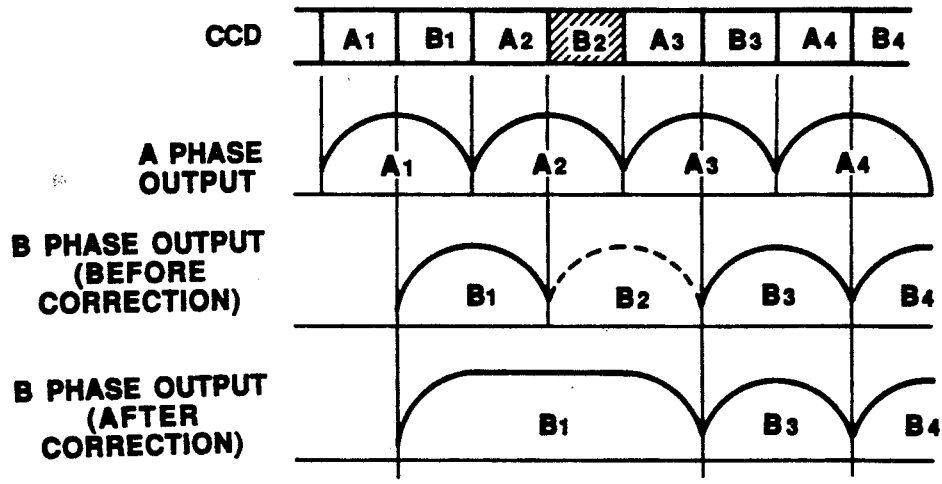
FIG. 3 is a timing chart for illustrating the operation of the defect compensation circuit for the solid-state imaging device according to an embodiment of the present invention, when applied to a color imaging device operating under a spatial pixel shifting system.

With the above described defect compensation circuit, if a pixel $P_3$ of a horizontal line of the CCD image sensor 1 is defective, as shown in FIG. 2, the first sampling pulse $\phi_{SH1}$ from the timing signal generator 3 which is timed to the output timing of the defective pixel $P_3$ is dropped. Thus the first sample-and-hold circuit 5 performs an operation of defect compensation by a 0'th order holding compensation by substituting an imaging output $S_2$, from an adjacent left-side normal pixel $P_2$ for an imaging output $S_3$ from the defective pixel $P_3$ of the CCD image sensor 1. The second sample-and-hold circuit 6 sequentially sample-holds the output signals $SH_{OUT1}$ from the first sample-and-hold circuit 5, that is the imaging output signal corrected for defect by the 0'th order holding compensation, by the second sampling pulse $\phi_{SH2}$, while directly outputting the output signal $SH_{OUT1}$ of the first sample-and-hold circuit 5 during the time duration of the pulse width $\tau_0$ which is set so as to be longer than the time duration $\tau_1$ since the rising edge of the second sampling pulse $\phi_{SH2}$ in the output timing of the defective pixel $P_3$ until the falling edge of the succeeding first sampling pulse $\phi_{SH1}$ and shorter than the time duration $\tau_2$ since the aforementioned rising edge until the rising edge of the next succeeding first sampling pulse $\phi_{SH1}$. Thus the second sample-and-hold circuit 6 performs defect correction on the imaging output $S_3$ from the defective pixel $P_3$ from the CCD image sensor 1 by a mean-value interpolation of the imaging output $S_2$, from the left-side adjacent normal pixel $P_2$ and an imaging output $S_4$, from the right-side adjacent normal pixel $P_4$.

The output signal $SH_{OUT2}$ from the second sample-and-hold circuit 6, that is the imaging output signal corrected for defect by the mean-value interpolation, has a correction error which is one-half the correction error $\Delta$ of the output signal $SH_{OUT1}$ of the first sample-and-hold circuit 5, that is the imaging output signal corrected for defect by the 0'th order holding interpolation.

Meanwhile, when the present invention is applied to a color imaging device in which the image sensor for green-color imaging and image sensors for red-color imaging and blue-color imaging are arrayed with a horizontal shift by one-half the pixel pitch in accordance with a spatial pixel shift system, sample-and-hold means for the spatial pixel shift system may be used simultaneously as the aforementioned sample-and-hold circuit 6 without complicating the circuit. Also, when the present invention is applied to the color imaging device operating under the spatial pixel shift system, the imaging output from a defective pixel $B_2$ undergoes mean-value interpolation by the imaging output from the normal left-side adjacent pixel $B_1$ and the imaging output from the normal right-side adjacent pixel $B_3$, so that the pixel is not inadequately colored even if the imaging output from the defective pixel $B_2$ is contained in a B-phase imaging output.

It is noted that, in the above described defect compensation circuit, shown in FIG. 1, since the output signal $SH_{OUT1}$ of the first sample-and-hold circuit 5 is directly outputted from the second sample-and-hold circuit 6 during the period of the pulse width $\tau_0$ corresponding to the outputting period of the defective pixel $P_3$, there is a risk that noise components in the first sampling pulse $\phi_{SH1}$ be contained in the output signal.

In a modification of the present invention adapted for eliminating the noise component due to the first sampling pulse $\phi_{SH1}$, a third sample-and-hold circuit 8 is provided at an output side of the second sample-and-hold circuit 6 of the defect compensating circuit shown in FIG. 1, so that the output signal $SH_{OUT2}$ of the second sample-and-hold circuit 6 is oversampled by a third sampling pulse $\phi_{SH3}$ having a frequency twice that of the first and second sampling pulses $\phi_{SH1}$, $\phi_{SH2}$.

Figure 4:
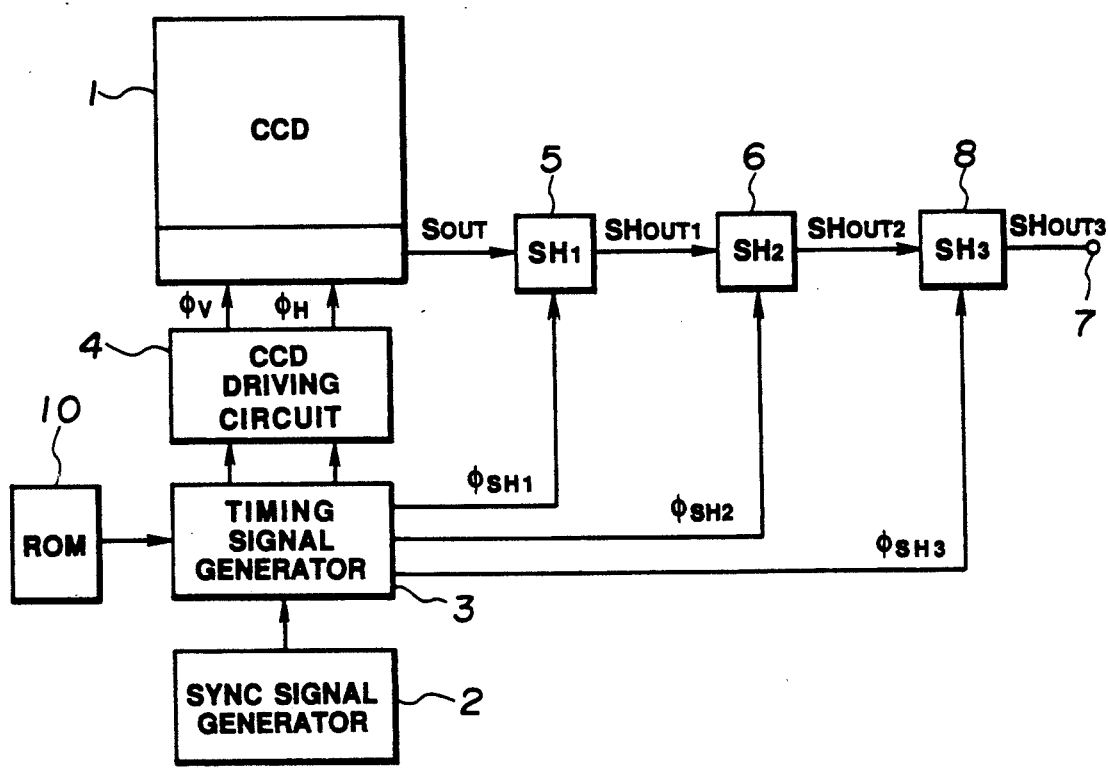
FIG. 4 is a circuit diagram showing a typical construction of a defect compensation circuit for the solid-state imaging device according to a modified embodiment of present invention.

Meanwhile, in the defect compensation circuit shown in FIG. 4, parts or components similar to those of the defect compensation circuit shown in FIG. 1 are depicted by the same reference numerals and the corresponding explanation is omitted for simplicity.

A timing generator 3 of the present defect compensation circuit generates timing signals for operating a CCD driving circuit 4, while generating and outputting a first sampling pulse $\phi_{SH1}$ to be transmitted to a first sample-and-hold circuit 5 for defect compensation by the 0'th order hold interpolation, a second sampling pulse $\phi_{SH2}$ to be transmitted to a second sample-and-hold circuit 6 for defect compensation by mean-valve interpolation, and a third sampling pulse $\phi_{SH3}$ to be transmitted to a third sample-and-hold circuit 8 for noise elimination by oversampling.

Figure 5:
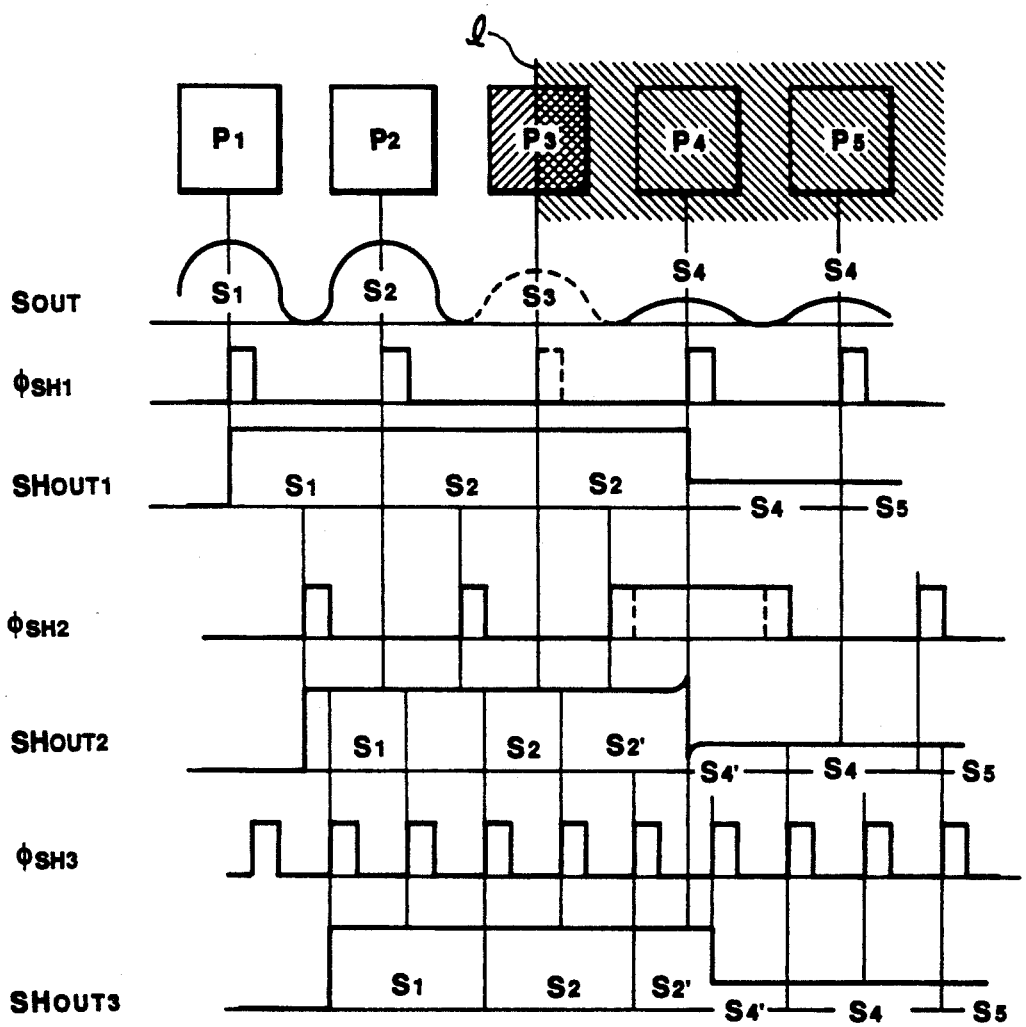
FIG. 5 is a timing chart for illustrating the operation of the defect compensation circuit shown in FIG. 4.
Figure 6:
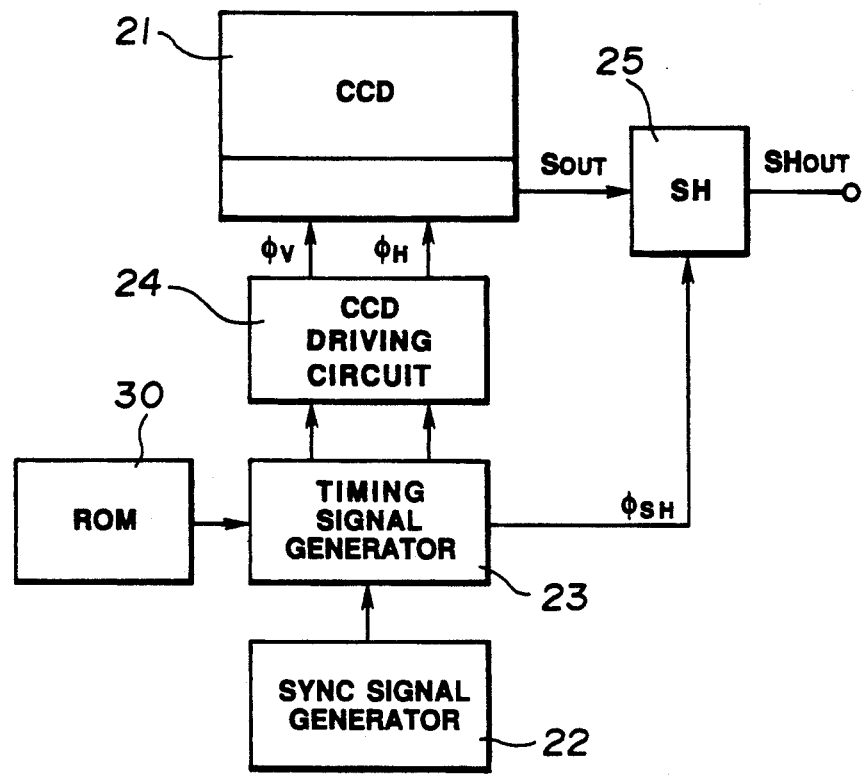
FIG. 6 is a block diagram showing a construction of a conventional defect compensation circuit.
Figure 7:
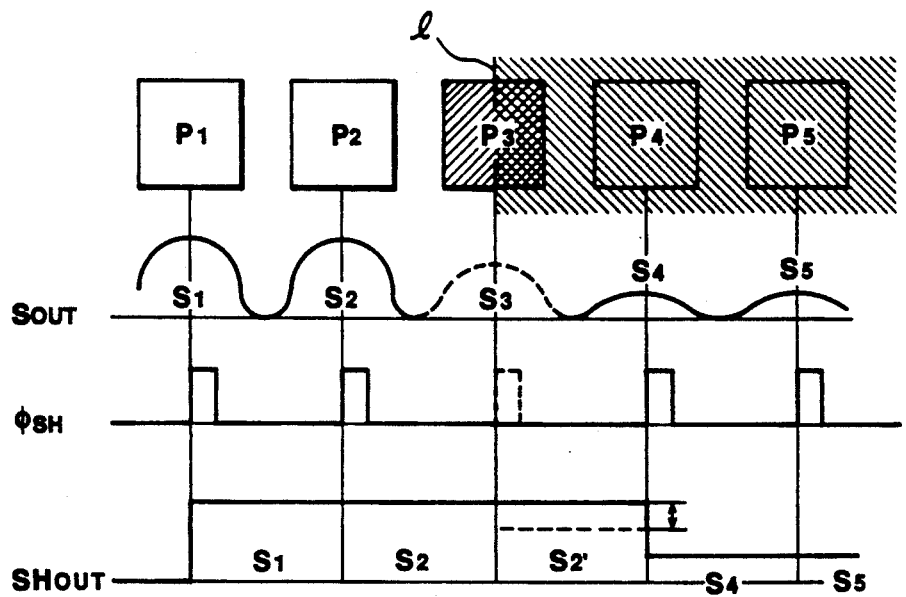
FIG. 7 is a timing chart for illustrating the operation of the conventional defect compensation circuit shown in FIG. 6.

With the present defect compensation circuit, if a pixel $P_3$ of a certain horizontal line of the CCD image sensor 1 is defective, as shown in FIG. 5, the first sample-and-hold circuit 5 sample-holds the imaging output signal $S_{OUT}$ from the CCD image sensor 1 by the first sampling pulse $\phi_{SH1}$ from the timing signal generator 3 to perform a defect compensation by 0'th order hold interpolation by substituting an imaging output $S_2$, from a normal left-side adjacent pixel $P_2$ for an imaging output $S_3$ from the defective pixel $P_3$ of the CCD image sensor 1. The second sample-and-hold circuit 6 sample-holds an output signal $SH_{OUT1}$ from the first sample-and-hold circuit 5 by the second sampling pulse $\phi_{SH2}$ or performing a defect compensation by mean-value compensation of the imaging output $S_3$ from the defective pixel $P_3$ of the CCD image sensor 1 by an imaging output $S_2$, from a normal left-side adjacent pixel $P_2$ and an imaging output $S_4$, from a normal right-side adjacent pixel $P_4$. Finally, the third sample-and-hold circuit 8 oversamples the output signal $SH_{OUT2}$ from the second sample-and-hold circuit 6 by the third sampling pulse $\phi_{SH3}$ to output an output signal $SH_{OUT3}$ freed of noise components N due to the first sampling pulse $SH_{OUT1}$ contained in the output signal $SH_{OUT2}$.

From the foregoing it is seen that the present invention provides a defect compensating circuit for a solid-state imaging device in which, for correcting defects in the imaging device by substituting an output signal from a defect-free pixel for an imaging signal from a defective one of a number of the pixels of the imaging device, the imaging output signal, corrected for defect by 0'th order holding interpolation by the first sample-and-hold circuit based on the position data read out from memory, is further corrected for error by mean-value interpolation by the second sample-and-hold circuit, and is additionally corrected, if need be, by the third sample-and-hold circuit by oversampling with the third sampling pulse, so that defect correction may be achieved with reduced correction error to produce imaging output signals with a satisfactory picture quality.

What is claimed is:

1. A defect correcting circuit for a solid-state imaging device comprising a storage circuit for storing position data indicating the position of a defective pixel among a number of pixels of the solid-state imaging device, a sampling pulse generator for generating a first sampling pulse timed to the pixels of the imaging device, and a second sampling pulse phase-shifted by 180° with respect to said first sampling pulse, a first sample-and-hold circuit for sample-holding an imaging output signal from the imaging device by said first sampling pulse, and a second sample-and-hold circuit for sample-holding an output signal of said first sample-and-hold circuit by said second sampling pulse, characterized in that said sampling pulse generator withholds the outputting of a first sampling pulse associated with the defective pixel among the pixels of the solid-state imaging device, based on said position data read out from said storage means, and in that said sampling pulse generator elongates the pulse width of a second sampling pulse associated with the defective pixel as far as at least the trailing edge of a first sampling pulse succeeding said second sampling pulse.

2. The defect correcting circuit as claimed in claim 1 characterized in that said first sample-and-hold circuit performs defect correction on an imaging output signal from the defective pixel of the imaging device by 0'th order holding interpolation, and in that said second sample-and-hold circuit performs defect correction on the imaging output signal, corrected for defect by said first sample-and-hold circuit, by a mean-value interpolation.

3. The defect correction circuit as claimed in claim 2 further comprising a third sample-and-hold circuit for oversampling an imaging output signal corrected for defect by said sample-and-hold circuit by a third sampling pulse for eliminating noise in said imaging output signal.

4. The defect correcting circuit as claimed in claim 1 characterized in that it is used with a color imaging device operating in accordance with a spatial pixel shift system in which a solid-state image sensor for green-color imaging and solid-state image sensors for blue-color and red-color imaging are arrayed with a horizontal shift by one-half the pixel pitch with respect to each other.

* * * * *